US010958723B2

(12) United States Patent
Zhang et al.

(10) Patent No.: US 10,958,723 B2
(45) Date of Patent: Mar. 23, 2021

(54) CLOUD-END DATA MULTICAST METHOD AND SYSTEM, AND COMPUTER DEVICE

(71) Applicant: TENCENT TECHNOLOGY (SHENZHEN) COMPANY LIMITED, Shenzhen (CN)

(72) Inventors: Yiwen Zhang, Shenzhen (CN); Kang Chen, Shenzhen (CN); Yaofu Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 7 days.

(21) Appl. No.: 16/240,252

(22) Filed: Jan. 4, 2019

(65) Prior Publication Data
US 2019/0141124 A1 May 9, 2019

Related U.S. Application Data

(63) Continuation of application No. PCT/CN2017/092432, filed on Jul. 11, 2017.

(30) Foreign Application Priority Data

Jul. 13, 2016 (CN) .......................... 201610552915.2

(51) Int. Cl.
*H04L 29/08* (2006.01)
*H04L 12/931* (2013.01)
(Continued)

(52) U.S. Cl.
CPC ........ *H04L 67/1044* (2013.01); *H04L 12/185* (2013.01); *H04L 12/4633* (2013.01);
(Continued)

(58) Field of Classification Search
CPC .................................................. H04L 67/1044
See application file for complete search history.

(56) References Cited

U.S. PATENT DOCUMENTS 7,707,300 B1\* 4/2010 Champagne ............ H04L 45/10
709/231
2010/0046516 A1\* 2/2010 Fernandez Gutierrez ...................
H04L 12/185
370/390

(Continued)

FOREIGN PATENT DOCUMENTS

CN 103795636 A 5/2014
CN 104253698 A 12/2014
(Continued)

OTHER PUBLICATIONS

The World Intellectual Property Organization (WIPO) International Search Report for PCT/CN2017/092432 dated Sep. 6, 2017 5 Pages (including transaltion).

(Continued)

*Primary Examiner* — John D Blanton
(74) *Attorney, Agent, or Firm* — Anova Law Group, PLLC

(57) ABSTRACT

A cloud-end data multicast method includes: obtaining a multicast packet, the multicast packet carrying a tenant identifier, a destination address, and a source address; and searching for a multicast group according to the tenant identifier and the destination address. The multicast group includes multicast members. The method also includes obtaining routes corresponding to the multicast members; generating a routing tree according to the routes corresponding to multicast members; and obtaining member addresses corresponding to the multicast members. The method also includes obtaining an address list containing addresses of target members that are identified to receive the multicast (Continued)

packet by performing address filtering according to the source address and the member addresses; encapsulating the multicast packet; and delivering the encapsulated multicast packet to the target members according to the address list and the routing tree.

20 Claims, 6 Drawing Sheets

(51) Int. Cl.
| | |
|---|---|
| *H04L 12/18* | (2006.01) |
| *H04L 12/761* | (2013.01) |
| *H04L 12/46* | (2006.01) |
| *H04L 12/753* | (2013.01) |
| *H04L 12/751* | (2013.01) |
| *H04L 12/927* | (2013.01) |
| *H04L 29/12* | (2006.01) |

(52) U.S. Cl.
CPC .......... *H04L 12/4641* (2013.01); *H04L 45/02* (2013.01); *H04L 45/16* (2013.01); *H04L 45/48* (2013.01); *H04L 47/806* (2013.01); *H04L 49/201* (2013.01); *H04L 61/2069* (2013.01); *H04L 12/1877* (2013.01)

(56) References Cited

U.S. PATENT DOCUMENTS

| | | | |
|---|---|---|---|
| 2011/0299537 | A1 | 12/2011 | Saraiya et al. |
| 2013/0242995 | A1 | 9/2013 | Onoue |
| 2013/0287032 | A1* | 10/2013 | Sharma ............... H04L 12/4641 |
| | | | 370/395.53 |
| 2014/0003427 | A1 | 1/2014 | Nishi et al. |
| 2014/0098813 | A1 | 4/2014 | Mishra et al. |
| 2014/0192804 | A1* | 7/2014 | Ghanwani ............... H04L 12/18 |
| | | | 370/390 |
| 2019/0141124 | A1* | 5/2019 | Zhang ................ H04L 61/2069 |

FOREIGN PATENT DOCUMENTS

| | | |
|---|---|---|
| CN | 104935443 A | 9/2015 |
| CN | 104954265 A | 9/2015 |
| CN | 104980287 A | 10/2015 |
| CN | 106209688 A | 12/2016 |
| WO | 2010097288 A1 | 9/2010 |

OTHER PUBLICATIONS

The State Intellectual Property Office of the People's Republic of China (SIPO) Office Action 1 for 201610552915.2 dated Oct. 22, 2018 8 Pages (including translation).
The European Patent Office (EPO) The Extended European Search Report for 17826962.7 dated May 8, 2019 10 Pages.

* cited by examiner

CLOUD-END DATA MULTICAST METHOD AND SYSTEM, AND COMPUTER DEVICE

This application is a continuation application of PCT Patent Application No. PCT/CN2017/092432, filed on Jul. 11, 2017, which claims priority to Chinese Patent Application No. 201610552915.2 entitled "Cloud-end Data Multicast Method, Device, and System" and filed with the State Intellectual Property Office of the PRC on Jul. 13, 2016, the entire contents of all of which are incorporated herein by reference.

FIELD OF THE TECHNOLOGY

This application relates to a technical field of cloud computing, and more particularly to, a cloud-end data multicast method, a cloud-end data multicast system, and a computer device.

BACKGROUND OF THE DISCLOSURE

Multicast is one of IP network data transmission modes. Multicast technology efficiently solves a problem of single-point sending and multi-point reception, and realizes high-efficient data transmission between a single sender and multiple receivers in an IP network. In cloud computing, multiple tenants are isolated to share one data center. However, the conventional multicast technology has no concept of tenant isolation, any device in a network can be added to any multicast group to receive data, and data security cannot be guaranteed efficiently. How to realize safe and efficient multicast at a cloud end becomes a technical problem that needs to be solved at present.

SUMMARY

The embodiments of this disclosure provide a cloud-end data multicast method, a cloud-end data multicast system, and a non-transitory storage medium.

A cloud-end data multicast method includes: obtaining a multicast packet, the multicast packet carrying a tenant identifier, a destination address, and a source address; and searching for a multicast group according to the tenant identifier and the destination address. The multicast group includes multicast members. The method also includes obtaining routes corresponding to the multicast members; generating a routing tree according to the routes corresponding to multicast members; and obtaining member addresses corresponding to the multicast members. The method also includes obtaining an address list containing addresses of target members that are identified to receive the multicast packet by performing address filtering according to the source address and the member addresses; encapsulating the multicast packet; and delivering the encapsulated multicast packet to the target members according to the address list and the routing tree.

A cloud-end data multicast system includes: a multicast gateway cluster and a center controller. The multicast gateway cluster is configured to obtain a multicast packet of a cloud end, the multicast packet carrying a tenant identifier, a destination address, and a source address, and search form a multicast group according to the tenant identifier and the destination address. The multicast group includes multicast members. The center controller, configured to compute routes corresponding to the multicast members, and generating a routing tree according to routes corresponding to the multicast members. The multicast gateway cluster is also configured to obtain member addresses corresponding to the multicast members, and obtain an address list containing addresses of target members that are identified to receive the multicast packet by performing address filtering according to the source address and the member addresses. The multicast gateway cluster is also configured to encapsulate the multicast packet to obtain an encapsulated multicast packet, and send the encapsulated multicast packet to a host computer corresponding to one of the target members according to the address list and the routing tree. The host computer is configured to receive the encapsulated multicast packet, and transmit the encapsulated multicast packet to a multicast member.

A non-transitory storage medium stores computer readable instructions. When being executed by one or more processors, the computer readable instructions cause the one or more processors to perform: obtaining a multicast packet, the multicast packet carrying a tenant identifier, a destination address, and a source address; and searching for a multicast group according to the tenant identifier and the destination address. The multicast group includes multicast members. The computer readable instructions further cause the one or more processors to perform: obtaining routes corresponding to the multicast members; generating a routing tree according to the routes corresponding to multicast members; and obtaining member addresses corresponding to the multicast members. The computer readable instructions further cause the one or more processors to perform: obtaining an address list containing addresses of target members that are identified to receive the multicast packet by performing address filtering according to the source address and the member addresses; encapsulating the multicast packet; and delivering the encapsulated multicast packet to the target members according to the address list and the routing tree.

The details of one or more embodiments of the present disclosure are disclosed in the following accompanying drawings and description. The other features, objectives, and advantages of the present disclosure will become obvious with reference to the description, accompanying drawings, and claims.

BRIEF DESCRIPTION OF THE DRAWINGS

To describe the technical solutions of the embodiments of this disclosure or the existing technology more clearly, the following briefly introduces the accompanying drawings required for describing the embodiments or the existing technology. Apparently, the accompanying drawings in the following description show only some embodiments of this disclosure, and a person of ordinary skill in the art may still derive other drawings from these accompanying drawings without creative efforts.

DESCRIPTION OF EMBODIMENTS

In order to make the objectives, technical solutions, and advantages of this disclosure be clearer and more comprehensible, this disclosure will be further described with reference to the accompany drawings and embodiments. It should be understood that, the specific embodiments described herein are only used to interpret this disclosure, rather than limiting this disclosure.

It can be understood that, the terms "the first", "the second", and so on in this disclosure are used to describe various elements. However, the elements are not limited by the terms. The terms are only used to distinguish the first element from the second element. For example, without departing from the scope of this disclosure, the first client can be called as the second client, and similarly, the second client can be called as the first client. The client and the second client are both clients, but are not the same client.

Figure 1:
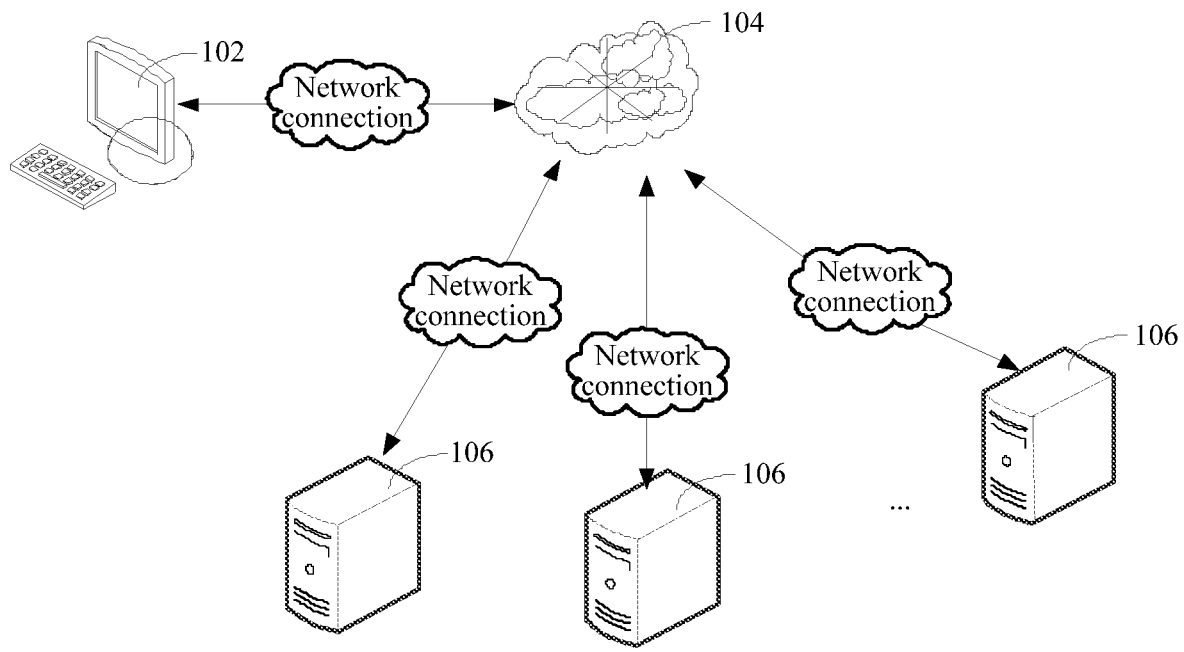
FIG. 1 is a hardware environment diagram of a cloud-end data multicast method according to one embodiment.

The cloud-end data multicast method in the embodiments of this disclosure can be applied in the hardware environment shown in FIG. 1. A terminal 102 is connected to a cloud end 104 via a network, and the cloud end 104 is connected to a host computer 106 via a network. A tenant builds a multicast application through the terminal 102 and the cloud end 104, and uploads source data to the cloud end 104 through the multicast application. The cloud end 104 obtains the source data to perform multicast in the form of a multicast packet. The multicast packet carries a tenant identifier, a destination address, and a source address. The cloud end 104 searches for a corresponding multicast group according to the tenant identifier and the destination address, and computes a routing tree corresponding to multiple multicast members in the multicast group. The cloud end 104 obtains member addresses corresponding to the multiple multicast members, performs address filtering according to the source address and the member addresses, so as to obtain an address list of members that require the multicast packet (e.g., an address list containing addresses of target members that are identified to receive the multicast packet) to encapsulate the multicast packet, and send the encapsulated multicast packet to the host computer 106 corresponding to the member addresses (e.g., the target members) according to the address list of members and the routing tree. The host computer 106 receives the encapsulated multicast packet, and transmits the encapsulated multicast packet to multicast members that require the multicast packet. Therefore, safe and efficient data multicast can be performed at the cloud end.

Figure 2:
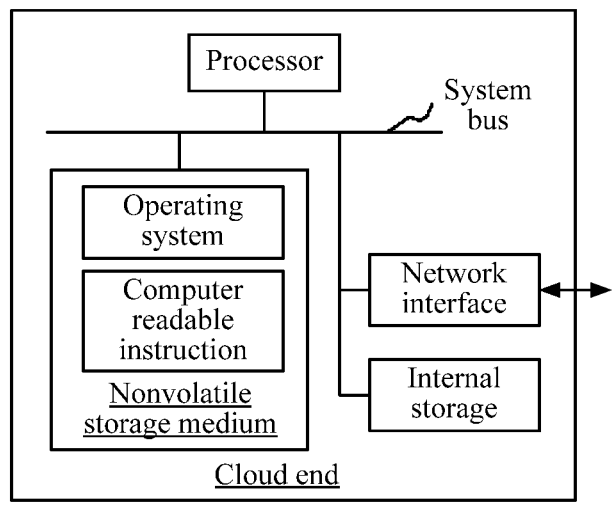
FIG. 2 is a block diagram of the cloud end in FIG. 1.

The cloud end can be realized by an independent server and a server cluster consisting of multiple servers. In one embodiment, the cloud end is an independent server, and the block diagram thereof is shown in FIG. 2. The server includes a processor, a nonvolatile storage medium, an internal storage, and a network interface connected through a system bus. The nonvolatile storage medium of the cloud end stores an operating system and a readable instruction, and the readable instruction is executed by the processor to realize the cloud-end data multicast method. The processor of the cloud end is configured to provide computation and control ability and support the operation of the whole cloud end. The internal storage of the cloud end provides an environment for operation of the operating system and the computer readable instruction in the nonvolatile storage medium. The network interface of the cloud end is configured to communicate with an external terminal through a network connection, for example, receive source data sent by the terminal and multicast packets delivered by multicast members. A person skilled in the art can understand that, the structure in FIG. 2 is only a block diagram of a part of the structure relating to the solution of this disclosure, does not limit a server on which the solution of this disclosure is applied, and a specific server can include more or less members than those in FIG. 2, combine with some members, or have a different member arrangement.

Figure 3:
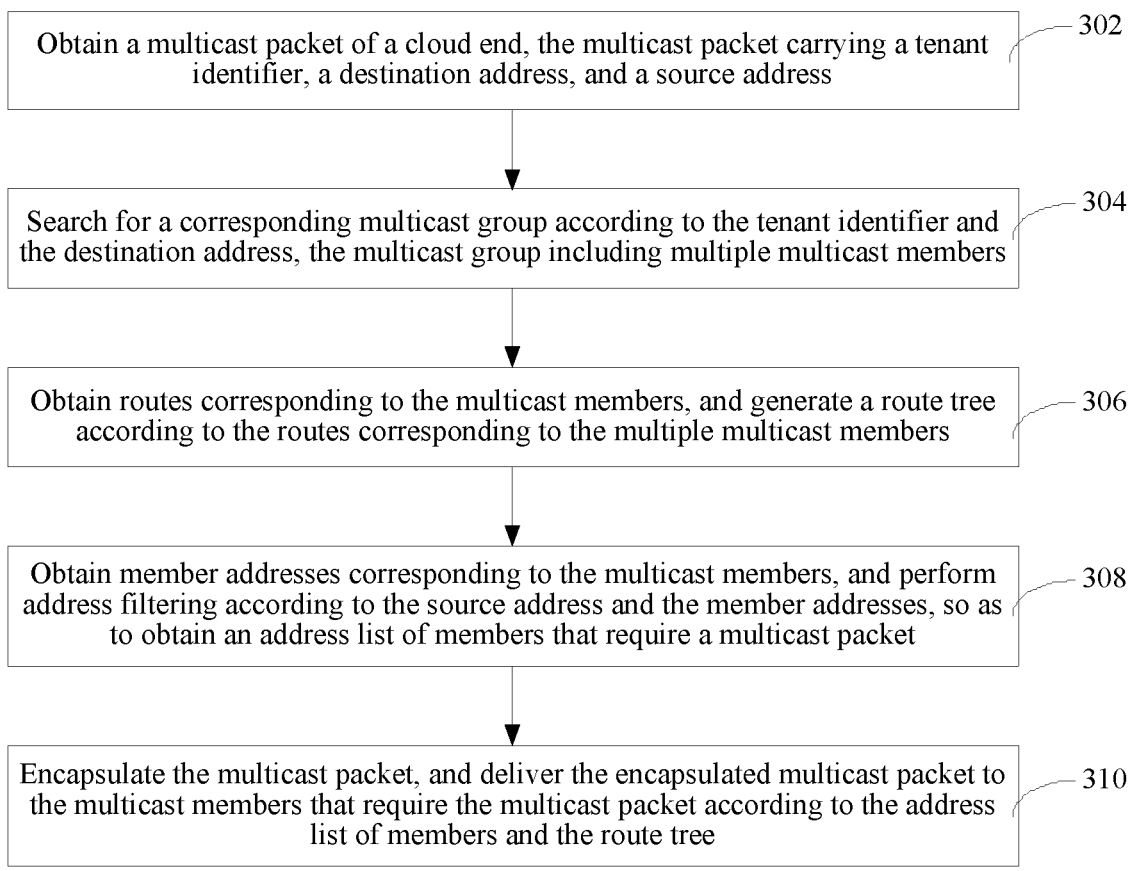
FIG. 3 is a flowchart of the cloud-end data multicast method according to one embodiment.

In one embodiment, as shown in FIG. 3, a cloud-end data multicast method is provided, and is described with an example of applying the method at a cloud end, and the method specifically includes the following steps.

Step 302: Obtain a multicast packet of a cloud end, the multicast packet carrying a tenant identifier, a destination address, and a source address.

The cloud end includes public cloud and private cloud. The public cloud usually means the cloud that is provided for a user by a third-party provider and can be used. The private cloud means cloud that is used and created by a certain tenant separately. The tenant uses a multicast application running in a terminal to upload source data to a data center of a cloud end. The cloud end multicasts source data in the form of a multicast packet. The multicast packet can use an Overlay (overlay network) encapsulation manner. The Overlay network is a deep extension of a physical network into cloud and virtualization, so as to make resource-based ability of cloud be out of various limits of the physical network. The multicast packet carries a tenant identifier, a destination address, a source address, and so on. The cloud end can determine the tenant to which the multicast packet belongs according to the tenant identifier, so as to determine a corresponding VPC (Virtual Private Cloud, one network logic isolation and partition service). The cloud end can use Overlay processing logic to perform multicast, efficiently isolate IP (Internet Protocol, a network protocol for interconnection) address spaces of different tenants, and can efficiently enhance security of multicast data.

Step 304: Search for a corresponding multicast group according to the tenant identifier and the destination address, the multicast group including multiple multicast members.

The cloud end can search for the corresponding multicast group according to the tenant identifier and the destination address. The multicast group includes multiple multicast members. The multicast members can be virtual machines on a virtualization platform of the cloud end. The virtual machines rely on a host computer to run. The virtual machines running on the host computer can be distributive, and different virtual machines can join different multicast groups. A virtual machine receives a multicast packet through a host computer. The virtual machine (that is, the multicast member) at this time can also be called as a data receiver. There are multiple kinds of multicast applications, including multimedia applications, data warehouses, and financial applications. By taking stock data pushing in a financial application as an example, after receiving stock data in a stock center, the cloud end delivers the stock data to multicast members in the form of multicast.

The multicast members can also serve as data senders. When a multicast member serves as a data sender, the multicast member uses a multicast application to perform Overlay encapsulation on source data to be sent and uploads the source data to the data center of the cloud end. The cloud end delivers the source data to other multicast members in the multicast group in the form of multicast according to the aforementioned manner. Furthermore, the data sender can also be a non-multicast member. The non-multicast member uses the multicast application to perform Overlay encapsulation on source data to be sent and uploads the source data to the data center of the cloud end.

Step 306: Obtain routes corresponding to the multicast members, and generate a routing tree according to the routes corresponding to the multiple multicast members.

The center controller of the cloud end computes a corresponding route according to a report packet fed back by a multicast member, and the routes corresponding to multiple multicast members on the same host computer can generate a host computer routing tree. Different host computers can generate different host computer routing trees. Virtual machines running on multiple host computers can join the same multicast group. Therefore, multiple host computer routing trees corresponding to multiple host computers joining the same multicast group can form a multicast group routing tree. The routing tree computed by the center controller includes a host computer routing tree and a multicast group routing tree.

Virtual machines running on a host computer can join a multicast group at any time to become multicast members, and multicast members can also exit the multicast group at any time. Therefore, the center controller needs to obtain change information of multicast members in real time, so as to update and compute the host computer routing tree corresponding to multicast members in real time according to a change condition of multicast members, thereby updating the multicast group routing tree.

Step 308: Obtain member addresses corresponding to the multicast members, and perform address filtering according to the source address and the member addresses, so as to obtain an address list of members that require a multicast packet.

When joining the multicast group, a multicast member will send a corresponding report packet. The package head of the report packet includes the IP address of the host computer IP, and the package body includes the source address that is specified for filtering. Since the multicast member is a virtual machine running on the host computer, the IP address of the host computer can be deemed as a member address corresponding to the multicast member. According to the source address that is specified for filtering carried in the package head, a source address filtering manner and a source address corresponding to the multicast member can be determined. The source address filtering manner includes INCLUDE, EXCLUDE, and GENERAL. INCLUDE means only receiving a multicast packet sent from a specified multicast source to the multicast group. EXCLUDE means only receiving a multicast packet sent from multicast source(s) other than the specified multicast source to the multicast group. GENERAL means regular query for querying multicast members joining and/or leaving the multicast group. INCLUDE can be called as a first filtering manner, EXCLUDE can be called as a second filtering manner, and GENERAL can be called as a third filtering manner. A multicast gateway cluster of the cloud end performs address filtering on multicast members according to the source address, the member address, and source address filtering manner, so as to obtain an address list of members that require a multicast packet.

Step 310: Encapsulate the multicast packet, and deliver the encapsulated multicast packet to the multicast members that require the multicast packet according to the address list of members and the routing tree.

The multicast gateway cluster supports two-tiered multicast forwarding of multicast packets, and encapsulates multicast packets into an Overlay format. The Overlay format includes GRE (Generic Routing Encapsulation, a generic routing encapsulation protocol) encapsulation protocol, a VXLAN (Virtual Extensible Local Area Network, a technology for encapsulating a two-tiered packet with a three-tiered protocol) encapsulation protocol, and an NVGRE (Generic Routing Encapsulation) encapsulation format. The multicast gateway cluster obtains the number of host computers in a multicast group according to the address list of members, and determines the number of photocopies of a multicast packet that needs to be duplicated according to the number of host computers. The multicast gateway cluster delivers the encapsulated multicast packet to the host computers that are corresponding to the multicast members and require the multicast packet based on the number of photocopies according to the address list of members and the routing tree. The host computer receives the encapsulated multicast packet, analyzes the encapsulated multicast packet, and obtains an analyzed multicast packet. The host computer delivers the analyzed multicast packet to a virtual machine in a multicast group running on the host computer through a Bridge (a network bridge).

The conventional IP multicast technology requires that all network devices support the multicast protocol, resulting in a high construction cost of a network. In some embodiments, no requirements are provided for network devices, and network devices do not need to be upgraded or improved, thereby saving the construction cost of a network.

In some embodiments, since a multicast packet of the cloud end carries a tenant identifier, a destination address, and a source address, a corresponding multicast group can be searched for precisely according to the tenant identifier and the destination address, so as to efficiently isolate IP address spaces of different tenants. Member addresses corresponding to multicast members are obtained and address filtering is performed according to the source address and the member addresses, so as to obtain the address list of members that require the multicast packet. The corresponding routes are respectively computed for multiple multicast members in the multicast group, so as to generate a routing tree according to the multiple routes. The multicast packet is encapsulated, so that the encapsulated multicast packet forwarded according to the address list of members and the routing tree can be delivered to the multicast members that require the multicast packet accurately, thereby ensuring the delivery accuracy of multicast data and realizing safe and efficient data multicast at the cloud end.

In one embodiment, the step of computing routes corresponding to multicast members and generating a routing tree according to the routes corresponding to the multiple multicast members includes: obtaining report packets returned by the multiple multicast members; computing the routes corresponding to the multicast members according to the report packets; generating a routing tree according to the routes corresponding to the multiple multicast members; obtaining a routing tree topological structure used by a data plane, and writing the routing tree corresponding to the multiple multicast members into a routing tree data structure used by a data plane according to the routing tree topological structure.

The IP multicast technology controls and manages running of all network protocols through the control plane, and processes and forwards data on different interfaces through a data plane. In the conventional IP multicast technology, since a control plane and a data plane are not separated from each other and run on the same device, the complexity of a single-point device is enhanced, the reliability is reduced, and the operation, maintenance, and troubleshooting difficulties are increased.

Figure 4:
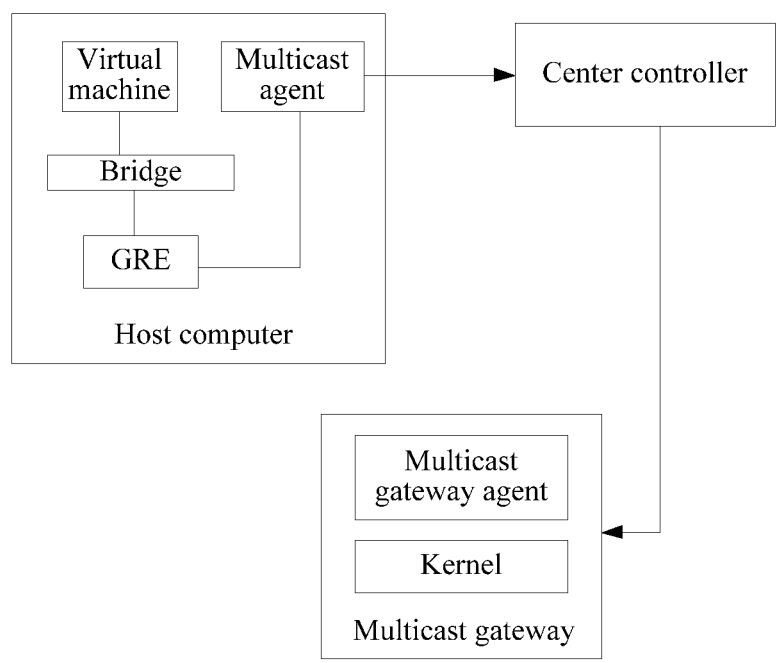
FIG. 4 is an architectural diagram of a control plane according to one embodiment.

In some embodiments, the cloud end separates a control plane and a data plane completely, and the control plane and the data plane run on different devices. The control plane runs on a center controller and the data plane run on a multicast gateway cluster. The architecture diagram of the control plane is shown in FIG. 4. A virtual machine and a multicast agent run on a host computer. The center controller and the multicast agent establish communications through a network. A multicast gateway agent and a kernel run in the multicast gateway cluster. The multicast gateway cluster is responsible for data forwarding of a data plane. Specially, the multicast gateway cluster can realize data forwarding of a data plane through customizing an Overlay processing logic in the Linux kernel of a universal server. The center controller establishes communications with the multicast gateway agent through the network. The multicast agent sends regular query to all virtual machines on the host computer periodically according to the IGMP (Internet Group Management Protocol), the virtual machine joining the multicast will reply a report packet, and the multicast agent obtains the report packet. The application range of the IMGP does not exceed the host computer, and the multicast agent obtains the report packet before the route of the host computer is queried.

The distributive multicast agent sends the report packet corresponding to the multicast member in the host computer to the center controller, the center controller can compute routes corresponding to multicast members according to the report packet, and then generate a host computer routing tree and a multicast group routing tree according to the routes corresponding to multiple multicast members. The multicast gateway agent running on the multicast gateway cluster reads the host computer routing tree and the multicast group routing tree, and uses the routing tree topological structure used by the data plane to write the read host computer routing tree and multicast group routing tree into the routing tree data structure used by the data plane. Since a virtual machine running on the host computer can join the multicast group to become a multicast member at any time, and a multicast member can also exit the multicast group at any time. Therefore, the multicast agent sends the change information of the multicast members obtained in real time to the center controller. The center controller performs update computation on the host computer routing tree and the multicast group routing tree according to the change information of the multicast members. The multicast gateway agent running on the multicast gateway cluster reads the updated host computer routing tree and updated multicast group routing tree, uses the routing tree topological structure used by the data plane to write the updated host computer routing tree and multicast group routing tree that are read into a routing tree data structure used by the data plane. Thus, route updating is finished. Since the host computer routing tree and the multicast group routing tree are updated in real time according to a change condition of multicast members, it can be ensured that the multicast gateway cluster forwards a multicast packet accurately.

Furthermore, the multicast agent and the center controller can further establish communications through a middleware. The center controller and the multicast gateway agent can also establish communications through a middleware. The multicast gateway cluster can also realize data forwarding of a data plane through a dedicated network development kit.

For example, the middleware between the multicast agent and the center controller serves as a message queue, the middleware between the center controller and the multicast gateway agent is Zookeeper (a distributive application program coordination service with open source code), and then, the process of route updating is supplemented. The distributive multicast agent obtains report packets replied by multiple virtual machines and can learn a change condition of multiple multicast members on the host computer according to the report packets. The distributive multicast agent sends the change information of the multicast members on the host computer to the message queue middleware. The independently deployed center controller reads the change information of the multicast members from the message queue middleware, computes an updated host computer routing tree and an updated multicast group routing tree according to the change information, and writes the updated host computer routing tree and the updated multicast group routing tree to the Zookeeper middleware. The multicast gateway agent reads the updated host computer routing tree and the updated multicast group routing tree from the Zookeeper, uses the routing tree topological structure used by the data plane to write the updated host computer routing tree and the updated multicast group routing tree that are read into the routing tree data structure used by the data plane, so as to finish route updating.

Figure 5:
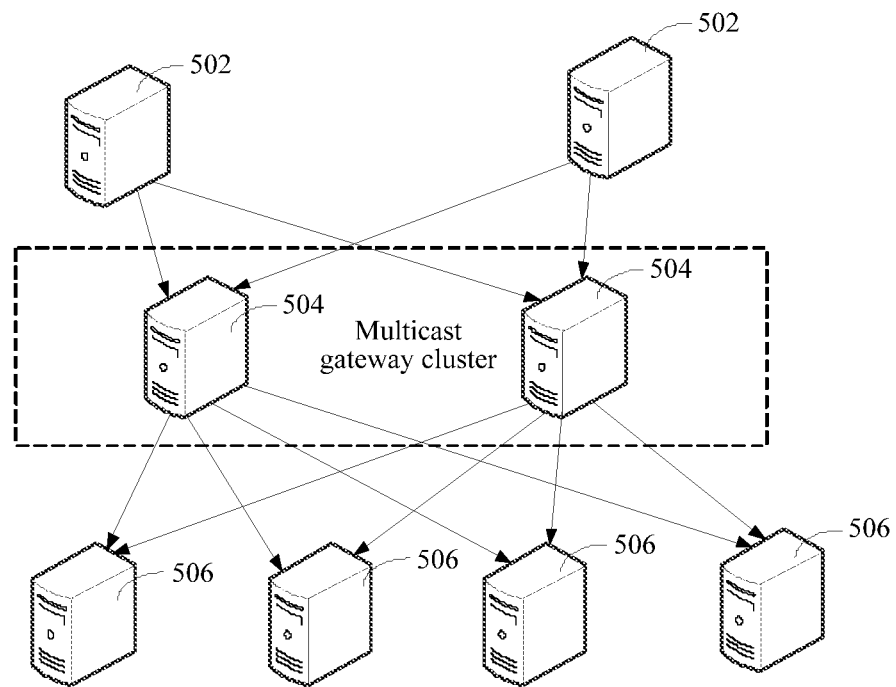
FIG. 5 is an architectural diagram of a data plane according to one embodiment.

The architecture of the data plane is shown in FIG. 5. A data receiving device 502 is configured to receive a multicast packet uploaded by a tenant through a multicast application. The multicast gateway cluster 504 is configured to duplicate a multicast packet of a data plane and forwards the same to a host computer 506 corresponding to a multicast member that requires the multicast packet. The multicast gateway cluster 504 can use multiple universal servers to realize forwarding of a multicast packet.

A data center uses a group of multicast gateway (Multicast Gateway, MCGW, a device for bearing duplication and forwarding of a multicast data packet) clusters. The multicast gateway cluster includes multiple forwarding devices. The forwarding device may be a universal server. Each forwarding device is completely equal in logic, and each multicast packet can obtain the same processing result from any forwarding device. The forwarding device uses a dendriform route data structure when performing forwarding. Specifically, the forwarding device can use a multicast group routing tree to forward multicast data.

In some embodiments, the control plane and the data plane run on different devices and are isolated from each other completely, thereby reducing the complexity of a single-point device, reducing the reliability, and increasing the operation, maintenance, and troubleshooting difficulties.

In one embodiment, the routing tree includes a host computer routing tree and a multicast group routing tree, after the steps of computing routes corresponding to multicast members and generating a routing tree according to the routes corresponding to the multiple multicast members, the method further includes: traversing the nodes of the host computer routing tree; obtaining an increment change message of the host computer routing tree; and performing update computation on the multicast group routing tree according to the increment change message of the host computer routing tree.

Figure 6:
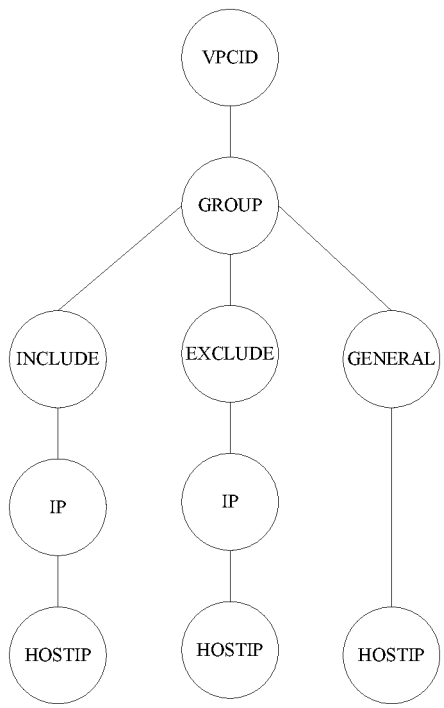
FIG. 6 is a data structural diagram of a routing tree of a multicast group according to one embodiment.

In some embodiments, the center controller computes the routes of the multicast members through one or more progresses. The route change corresponding to the same tenant identifier is computed and processed by the same progress. One progress can process the routes corresponding to multiple tenant identifiers. The routes corresponding to multiple multicast members can be represented by a topological diagram of a dendriform data structure, the routes corresponding to multiple multicast members on the same host computer can compose a host computer routing tree. Multiple host computer routing trees corresponding to multiple host computers joining the same multicast group can form a multicast group routing tree. The data structural diagram of the multicast group routing tree is shown in FIG. 6, the root node of the multicast group routing tree is corresponding to VPC, and the corresponding root node can be positioned and searched for according to the multicast packet. A leaf code is corresponding to the multicast packet and needs to be sent to a host computer. Since transmission of the multicast packet needs to be realized through a physical network, the leaf node can only be corresponding to the host computer, and does not need to be corresponding to a virtual machine running on the host computer. Each multicast group has a corresponding multicast address. Each multicast address in the multicast group routing tree is provided with three source address filtering manners, including INCLUDE, EXCLUDE, and GENERAL. The addresses of multiple multicast members are filtered based on the source address filtering manner according to the source address and the member address, so as to obtain an address list of members that require the multicast packet. In FIG. 6, VPCID represents a VPC identifier (that is, the tenant identifier), GROUP represents a multicast address, IP represents a source address, and HOSTIP represents multicast members.

Figure 7:
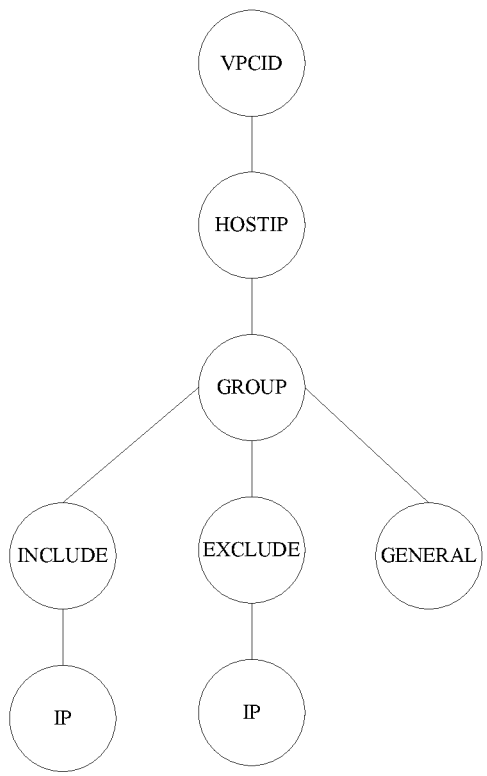
FIG. 7 is a data structural diagram of a routing tree of a host computer according to one embodiment.

According to the report packet and query packet corresponding to the multicast members reported by the multicast agent, the center controller can represent the relationship between multiple multicast members in the host computer joining the same multicast group by using the host computer routing tree. The data structural diagram of the host computer routing tree is shown in FIG. 7, the root node of the host computer routing tree is corresponding to VPC, a primary sub-node is the address of a host computer (that is, the member address), and a secondary sub-node is a multicast address. The multicast address is provided with three source address filtering manners, including INCLUDE, EXCLUDE, and GENERAL. The sub-node is a source address. Address filtering is performed on the source address and the member addresses according to the corresponding filtering manner, so as to ensure that multicast members obtain required multicast packets.

When a root node or sub-node in a host computer routing tree is changed, the center controller traverses the nodes of the host computer routing tree to obtain an increment change message of the host computer routing tree, and performs update computation on the multicast group routing tree according to the increment change message.

Specifically, the center controller traverses the nodes of the host computer routing tree through one or more progresses. Memory mapping corresponding to the host computer routing tree is obtained, the memory mapping corresponding to the host computer routing tree stores the data structure of the host computer routing tree, and whether a member address is newly added or deleted is judged according to the data structure of the stored host computer routing tree. If a member address is newly added or deleted, member addresses in the memory mapping are updated.

The center controller judges whether a member address sub-node is newly added or deleted. Specifically, the center controller judges whether a multicast group is newly added or deleted through one or more progresses according to the memory mapping corresponding to the multicast group. When a newly added multicast group exists, whether a GENERAL sub-node exists is judged, if a GENERAL sub-node does not exist, a V2 record group is newly added. V2 means a V2 version of the IGMP. An EXCLUDE list is traversed and an INCLUDE list is traversed, and the count of multicast members of the multicast group is added by 1, so as to perform one traversal on the newly added multicast group.

When a V2 record group is newly added, if no multicast address exists in the memory mapping corresponding to the multicast group routing tree, the newly created multicast group is invoked. If the multicast members in the multicast group have reached the upper limit, the multicast group is returned. A member address sub-node is created in the center controller or on the Zookeeper middleware, and the member address sub-node can be described as: MCGroup/$vpcid/$group/INCLUDE/$ip/$hostip node. MCGroup represents a multicast group, vpcid represents a tenant identifier, group represents a multicast address, ip represents a source address, and hostip represents a member address. The member address sub-node is deleted from all IPs in the INCLUDE list in the memory mapping corresponding to the host computer routing tree, and the deleted member address sub-node can be described as: MCGroup/$vpcid/$group/INCLUDE/$ip/$hostip node. The member address sub-node is deleted from all source addresses in the EXCLUDE list in the memory mapping corresponding to the host computer routing tree, and the deleted member address sub-node can be described as: MCGroup/$vpcid/$group/EXCLUDE/$ip/$hostip node.

When a deleted multicast group exists, a member address node under the GENERAL sub-node is deleted. The deleted member address sub-node can be described as: MCGroup/$vpcid/$group/GENERAL/$hostip node. For all source addresses in the INCLUDE list in the memory mapping corresponding to the host computer routing tree, a member address sub-node under the INCLUDE node is deleted, the deleted member address sub-node can be described as: MCGroup/$vpcid/$group/INCLUDE/$ip/$hostip node. For all source addresses in the EXCLUDE list in the memory mapping corresponding to the host computer routing tree, a member address sub-nodes under the EXCLUDE node is deleted, and the deleted member address sub-node can be described as: MCGroup/$vpcid/$group/EXCLUDE/$ip/$hostip node. The data in the memory mapping corresponding to the host computer routing tree and the data in the memory mapping corresponding to the multicast group routing tree are deleted, and 1 is subtracted from the count of multicast groups.

In some embodiments, when a root node or sub-node in the host computer routing tree is changed, the nodes of the host computer routing tree are traversed to obtain an increment change message of the host computer routing tree and perform update computation on the multicast group routing tree according to the increment change message, so as to obtain an accurate routing tree, thereby ensuring the accuracy of delivery of multicast data.

In one embodiment, the method further includes: receiving a multicast group operation instruction sent by a terminal through a multicast application, the operation instruction carrying a tenant identifier, a filtering manner, a filtering address set, and a multicast address, and newly creating or deleting the multicast group according to the tenant identifier, the filtering manner, the filtering address set, and the multicast address.

In some embodiments, the tenant can send a multicast operation instruction to the cloud through the multicast application running in the terminal, and the multicast operation instruction includes a newly added multicast group and a deleted multicast group. When the multicast group operation instruction received by the cloud end is a newly added multicast group instruction, the newly added multicast group instruction carries the tenant identifier, the filtering manner, the filtering address set, and the multicast address. The filtering address set includes source addresses corresponding to the filtering types. A multicast address node is created according to the tenant identifier and the multicast address carried in the newly created multicast group instruction, and a corresponding filtering type is configured. The filtering type includes INCLUDE, EXCLUDE, and GENERAL. A source address sub-node corresponding to the filtering type is created. A corresponding source address is obtained from the filtering address set according to the filtering type, and the source address corresponding to the filtering type is configured to the source address sub-node. The count of multicast addresses corresponding to the tenant identifier is added with 1, thereby finishing creation of a multicast group.

When the multicast group operation instruction received by the cloud end is the deleted multicast group instruction, the tenant identifier, the filtering manner, the filtering address set and the multicast address are carried in the deleted multicast group instruction are deleted. According to the filtering manner, the filtering addresses are traversed, and according to the tenant identifier and the multicast address, the source address sub-nodes corresponding to the filtering manner are deleted. The sub-nodes under the multicast address node in the memory mapping corresponding to the host computer routing tree and the multicast address are deleted. Meanwhile, 1 is subtracted from the count of the multicast addresses corresponding to the tenant identifier, thereby finishing the deleting operation of one multicast group.

In some embodiments, the cloud end receives a multicast group operation instruction sent by a terminal to trigger operations such as new creation or deletion on the multicast group. Therefore, a tenant adjusts a corresponding multicast group appropriately according to the demand, so as to provide convenience for a tenant.

In one embodiment, the step of performing address filtering according to the source address and the member addresses to obtain the address list of members that require the multicast packet includes: obtaining report packets corresponding to multicast members, each report packet carrying a member address of the multicast member, source addresses, and filtering manners corresponding to the source addresses, and obtaining the address list by filtering the member addresses of the multicast members based on filtering manners according to the source addresses and the member addresses of the multicast members.

In some embodiments, when joining a multicast group, a multicast member sends a corresponding report packet. The package head of the report packet includes an IP address of a host computer, and the package body includes a source address specified for filtering and a filtering manner. After searching for a corresponding multicast group according to a tenant identifier and a destination address, the multicast gateway cluster creates a temporary list that includes a first temporary list and a second temporary list. The multicast gateway cluster filters the addresses of the multiple multicast members based on the filtering manner according to the source address and the member addresses, so as to obtain an address list of members that require the multicast packet.

In one embodiment, the step of filtering addresses of multiple multicast members based on the filtering manner according to the source address and the member addresses so as to obtain an address list of members that require the multicast packet includes: obtaining a first filtering list corresponding to a first filtering manner (e.g., a first filtering list corresponding to multicast members having the first filtering manner), traversing the first filtering list and determining whether a member address in the first filtering list is the same as the source address (e.g., a source address included in the report packet of the multicast member having the member address), if the member address in the first filtering list is the same as the source address, duplicating subordinate multicast members to the first temporary list; obtaining a second filtering list corresponding to the second filtering manner, traversing the second filtering list, determining whether a member address in the second filtering list is the same as the source address, if the member address in the second filtering list is the same as the source address, deleting the host computer corresponding to the subordinate multicast members (e.g., a second multicast member) from the second temporary list; and combining the first temporary list and the second temporary list to obtain an address list of members that require the multicast packet.

The multicast gateway cluster generates an INCLUDE list for the member addresses corresponding to the multiple multicast members of INCLUDE according to the filtering manner, generates an EXCLUDE list for the member addresses corresponding to the multiple multicast members of EXCLUDE according to the filtering manner, generates a GENERAL hash list for the member addresses corresponding to the multiple multicast members of GENERAL according to the filtering manner. INCLUDE can be called as a first filtering manner, EXCLUDE can be called as a second filtering manner, and GENERAL can be called as a third filtering manner. Correspondingly, the corresponding INCLUDE list can be called as a first filtering list, the EXCLUDE list can be called as a second filtering list, and the GENERAL hash list can be called as a third filtering list.

The multicast gateway cluster traverses the INCLUDE list, judges whether a member address in the INCLUDE list is the same as the source address, and if the member address in the INCLUDE list is the same as the source address, duplicates subordinate host computer members to the first temporary list. Host computer members in the GENERAL hash list are duplicated to the second temporary list. The multicast gateway cluster traverses the EXCLUDE list, judges whether an EXCLUDE member address is the same as the source address, and if the EXCLUDE member address is the same as the source address, deletes subordinate host computer members from the second temporary list. After the EXCLUDE list has been traversed, the second temporary list is connected to the end of the first temporary list, so as to generate the address list of members that require the multicast packet.

Since multicast members can be join or exit at any time, when the INCLUDE list and/or EXCLUDE list is traversed, the change information of the sub-node in the host computer routing tree needs to be obtained, and update is performed according to the change information of the sub-node in the host computer routing tree.

Specifically, when the INCLUDE list is traversed, the memory mapping corresponding to the host computer is obtained, if the general mark of the multicast group in the memory mapping corresponding to the host computer routing tree is true, it represents that the sub-node is not changed and may not be processed.

The memory mapping corresponding to the multicast group is obtained, if no multicast address node exists in the memory mapping corresponding to the multicast group, a multicast group needs to be newly created. The multicast address node can be described as: MCGroup/$vpcid/$group. A newly created multicast group function is invoked, all the INCLUDE sub-nodes are input to an address filtering list. The INCLUDE sub-node can be described as: MCHost/$vpcid/$hostip/$group/INCLUDE sub-node.

Whether a source address is newly added or deleted is judged, if a source address is newly added or deleted, the memory mapping corresponding to the host computer routing tree is updated. When a newly source address exists, if the data at the level of the memory mapping corresponding to the multicast group routing tree does not have any newly added source address, the newly created multicast group function needs to be invoked, and the newly added source address is input to the newly added multicast group. If the EXCLUDE list in the memory mapping corresponding to the multicast group routing tree has the newly added source address, and the EXCLUDE list has the same member address, the member address needs to be processed according to the V2 version of the IGMP. According to the newly added source address, updating is performed in the memory mapping corresponding to the multicast group routing tree, and a corresponding member address sub-node is created. The member address sub-node can be described as: MCGroup/$vpcid/$group/EXCLUDE/$ip/$hostip node.

When a deleted source address exists, the data in the memory mapping corresponding to the multicast group routing tree is updated, and the corresponding member address sub-node under the EXCLUDE sub-node is deleted, and the member address sub-node be described as: MCGroup/$vpcid/$group/EXCLUDE/$ip/$hostip node. If the member address node is blank, the deletion multicast group function is invoked, the deleted source address is deleted, and thus, the source address is deleted.

When the multicast gateway cluster traverses the EXCLUDE list, if the general mark of the multicast group in the memory mapping corresponding to the host computer routing tree is true, no processing is performed. If the multicast address node in the memory mapping corresponding to the multicast group does not exist, a multicast group needs to be newly created. The multicast address node can be described as MCGroup/$vpcid/$group. The newly created multicast group function is invoked, and all the EXCLUDE sub-nodes are input to the address filtering list. The EXCLUDE sub-node can be described as MCHost/$vpcid/$hostip/$group/EXCLUD sub-node.

Whether a source address is newly added or deleted is judged, if a source address is newly added or deleted, the memory mapping corresponding to the host computer routing tree is updated. When the newly added source address exists, the newly created multicast group function needs to be invoked, and the newly added source address is input to the newly added multicast group. Updating is performed in the memory mapping corresponding to the multicast group routing tree according to the newly added source address, and a corresponding member address sub-node is created. The member address sub-node can be described as: MCGroup/$vpcid/$group/GENERAL/$hostip node. If the EXCLUDE sub-node in the memory mapping corresponding to the multicast group routing tree is blank, the member address sub-node under the EXCLUDE sub-node is created, and the member address sub-node can be described as: MCGroup/$vpcid/$group/EXCLUDE/$ip/$hostip node. Otherwise, member address sub-nodes corresponding to the other source addresses under the EXCLUDE sub-node are deleted, and the deleted member address sub-nodes can be described as: MCGroup/$vpcid/$group/EXCLUDE/other source address /$hostip node.

When the deleted source address exists, the data of the memory mapping corresponding to the multicast group routing tree is updated, the corresponding member address sub-node under the EXCLUDE sub-node is deleted, and the member address sub-node can be described as: MCGroup/$vpcid/$group/EXCLUDE/$ip/$hostip node. If the member address sub-node is blank, the deletion multicast group function is invoked, and the deleted source address is input, so as to delete the source address.

In some embodiments, when the INCLUDE list is traversed and the EXCLUDE list is traversed, timely update is performed according to the increase and decrease conditions of the sub-nodes in the host computer routing tree, so as to ensure the accuracy of address filtering, and enhance accuracy of delivery of a multicast packet.

In one embodiment, the center controller controls the scale of a multicast group. Specifically, the center controller obtains the number of leaf nodes in the Group tree, and judges whether the number of leaf nodes is smaller than or equal to the number of leaf nodes corresponding to a tenant identifier. If the number of leaf nodes is not smaller than or equal to the number of leaf nodes corresponding to a tenant identifier, no multicast members are allowed to join the multicast group. In the public cloud, if there are too many leaf nodes corresponding to some tenants, more resources are occupied, with a result that resource utilization is unbalanced.

If multicast members join or exit the multicast group frequently, excessive resource consumption is caused. In one embodiment, the center controller further can limit the frequency of joining and exiting of multicast members. Specifically, the center controller obtains the number of times of the multicast members joining or exiting the multicast group in a preset period of time, if the number exceeds a preset number, the multicast members are prevented from joining or exiting the multicast group, thereby efficiently reducing resource consumption.

Figure 8:
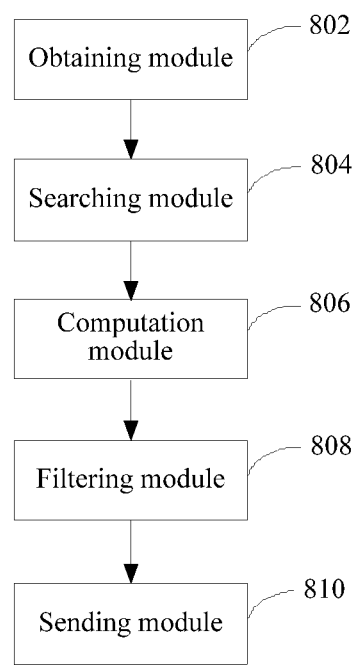
FIG. 8 is a block diagram of a computer device according to one embodiment.

As shown in FIG. 8, this disclosure further provides a computer device, the internal structure of the computer device is corresponding to the structure shown in FIG. 2, and each module can be realized wholly or partially through software, hardware, or a combination thereof. In one embodiment, the computer device includes an obtaining module 802, a searching module 804, a computation module 806, a filtering module 808, and a sending module 810.

The obtaining module 802 is configured to obtain a multicast packet of a cloud end, the multicast packet carrying a tenant identifier, a destination address, and a source address.

The searching module 804 is configured to search for a corresponding multicast group according to the tenant identifier and the destination address, the multicast group including multiple multicast members.

The computation module 806 is configured to compute routes corresponding to the multicast members, and generate a routing tree according to the routes corresponding to the multiple multicast members.

The filtering module 808 is configured to obtain the member addresses corresponding to the multicast members, perform address filtering according to the source address and the member addresses, and obtain the address list of members that require the multicast packet.

The sending module 810 is configured to encapsulate the multicast packet, and deliver the encapsulated multicast packet to the multicast members that require the multicast packet according to the address list of members and the routing tree.

In one embodiment, the computation module 806 is further configured to obtain a report packet returned by multiple multicast members in a host computer; compute routes corresponding to the multicast members according to the report packet; generate a routing tree according to the routes corresponding to the multiple multicast members; take a routing tree topological structure used by a data plane, and write the routing tree corresponding to the multiple multicast members into the routing tree data structure used by the data plane according to the routing tree topological structure.

In one embodiment, the filtering module 808 is further configured to obtain the report packet corresponding to the multicast members, the report packet carrying member addresses, a source address, and a filtering manner; and filter the addresses of the multiple multicast members based on the filtering manner according to the source address and the member addresses, so as to obtain the address list of members that require a multicast packet.

In one embodiment, the filtering manner includes a first filtering manner and a second filtering manner. The filtering module 808 is further configured to obtain a first filtering list corresponding to the first filtering manner, traverse the first filtering list, judge whether a member address in the first filtering list is the same as the source address, if the member address in the first filtering list is the same as the source address, duplicate subordinate multicast members to the first temporary list; obtain a second filtering list corresponding to the second filtering manner, traverse the second filtering list, judge whether a member address in the second filtering list is the same as the source address, if the member address in the second filtering list is the same as the source address, delete the host computer corresponding to subordinate multicast members from the second temporary list; combine the first temporary list and the second temporary list, so as to obtain the address list of members that require a multicast packet.

In one embodiment, the routing tree includes a host computer routing tree and a multicast group routing tree. The computation module 806 is further used to traverse the nodes of the host computer routing tree, obtain an increment change message of the host computer routing tree; and perform update computation on the multicast group routing tree according to the increment change message of the host computer routing tree.

Figure 9:
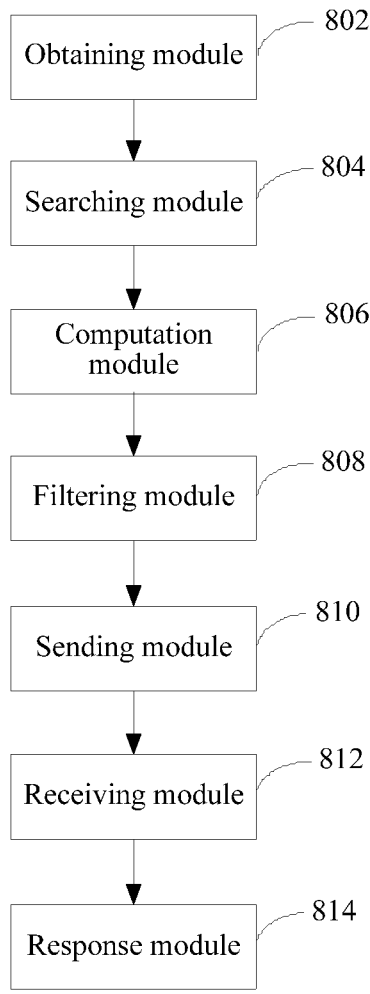
FIG. 9 is a block diagram of a computer device according to another embodiment.

In one embodiment, as shown in FIG. 9, the computer device further includes a receiving module 812 and a response module 814.

The receiving module 812 is configured to receive a multicast group operation instruction sent by a terminal through a multicast application, the operation instruction carrying a tenant identifier, a filtering manner, a filtering address set, and a multicast address.

The response module 814 is configured to newly create or delete a multicast group according to the tenant identifier, the filtering manner, the filtering address set, and the multicast address.

Figure 10:
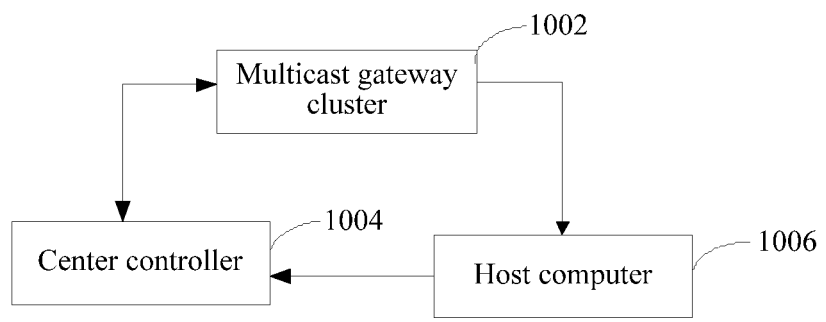
FIG. 10 is a block diagram of a cloud-end data multicast system according to one embodiment.

In one embodiment, as shown in FIG. 10, a cloud-end data multicast system includes a multicast gateway cluster 1002, a center controller 1004, and a host computer 1006.

The multicast gateway cluster 1002 is used to obtain a multicast packet of a cloud end, the multicast packet carrying a tenant identifier, a destination address, and a source address, and search for a corresponding multicast group according to the tenant identifier and the destination address, the multicast group including multiple multicast members.

The center controller 1004 is used to compute routes corresponding to the multicast members and generate a routing tree according to the routes corresponding to the multiple multicast members.

The multicast gateway cluster 1002 is further configured to obtain a routing tree topological structure used by a data plane, write the routing tree corresponding to the multiple multicast members into the routing tree data structure used by the data plane according to the routing tree topological structure; obtain the member addresses corresponding to the multicast members, perform address filtering according to the source address and the member addresses, so as to obtain the address list of members that require a multicast packet; encapsulate the multicast packet, and send the encapsulated multicast packet to the host computer corresponding to the member addresses according to the address list of members and the routing tree.

The host computer 1006 is configured to receive the encapsulated multicast packet, and deliver the encapsulated multicast packet to the multicast members that require a multicast packet.

In one embodiment, the routing tree includes a host computer routing tree and a multicast group routing tree, the center controller 1004 is further configured to traverse the nodes of the host computer routing tree, obtain an increment change message of the host computer routing tree; and perform update computation on the multicast group routing tree according to the increment change message of the host computer routing tree.

In one embodiment, the multicast gateway cluster 1002 is further configured to obtain a report packet corresponding to the multicast members, the report packet carrying member addresses, a source address, and a filtering manner; and filter the addresses of the multiple multicast members based on the filtering manner of the source address according to the source address and the member addresses, so as to obtain the address list of members that require a multicast packet.

In one embodiment, the multicast gateway cluster 1002 is further configured to obtain a first filtering list corresponding to the first filtering manner, traverse the first filtering list, judge whether a member address in the first filtering list is the same as the source address, if a member address in the first filtering list is the same as the source address, duplicate subordinate multicast members to the first temporary list; obtain a second filtering list corresponding to the second filtering manner, traverse the second filtering list, judge whether a member address in the second filtering list is the same as the source address, if a member address in the second filtering list is the same as the source address, delete the host computer corresponding to the subordinate multicast members from the second temporary list; combine the first temporary list and the second temporary list to obtain the address list of members that require a multicast packet.

In one embodiment, a computer device includes a storage and a processor, the storage stores a computer readable instruction, and when the instruction is executed by the processor, the processor performs the following steps: obtaining a multicast packet, the multicast packet carrying a tenant identifier, a destination address, and a source address; searching for a corresponding multicast group according to the tenant identifier and the destination address, the multicast group including multiple multicast members; obtaining routes corresponding to the multicast members, and generating a routing tree according to the routes corresponding to the multiple multicast members; obtaining member addresses corresponding to the multicast members, and performing address filtering according to the source address and the member addresses, so as to obtain an address list of members that require a multicast packet; and encapsulating the multicast packet, and deliver the encapsulated multicast packet to the multicast members that require a multicast packet according to the address list of members and the routing tree.

In one embodiment, the processor is further configured to: obtain a report packet returned by multiple multicast members; compute the routes corresponding to the multicast members according to the report packet; generate a routing tree according to the routes corresponding to the multiple multicast members; and obtain a routing tree topological structure used by the data plane, and write the routing tree corresponding to the multiple multicast members into the routing tree data structure used by the data plane according to the routing tree topological structure.

In one embodiment, the routing tree includes a host computer routing tree and a multicast group routing tree, the processor is further configured to: traverse the nodes of the host computer routing tree and obtain an increment change message of the host computer routing tree; and update the multicast group routing tree according to the increment change message of the host computer routing tree.

In one embodiment, the processor is further configured to: obtain a routing tree topological structure used by a data plane, write the host computer routing tree and the multicast group routing tree into the routing tree data structure used by the data plane according to the routing tree topological structure; read an updated multicast group routing tree; and write the updated multicast group routing tree into the routing tree data structure used by the data plane, so as to finish route updating.

In one embodiment, the processor is further configured to: obtain a report packet corresponding to multicast members, the report packet carrying member addresses, a source address, and a filtering manner, and filter the addresses of the multiple multicast members based on the filtering manner according to the source address and member addresses, so as to obtain the address list of members that require a multicast packet.

In one embodiment, the filtering manner includes a first filtering manner and a second filtering manner. The processor is further configured to: obtain a first filtering list corresponding to the first filtering manner, traverse the first filtering list, judge whether a member address in the first filtering list is the same as the source address, if a member address in the first filtering list is the same as the source address, duplicate subordinate multicast members to the first temporary list; obtain a second filtering list corresponding to the second filtering manner, traverse the second filtering list, judge whether a member address in the second filtering list is the same as the source address, if a member address in the second filtering list is the same as the source address, delete the host computer corresponding to the subordinate multicast members from the second temporary list; and combine the first temporary list and the second temporary list to obtain the address list of members that require a multicast packet.

In one embodiment, the processor is configured to: receive a multicast group operation instruction sent by a terminal, the operation instruction carrying a tenant identifier, a filtering manner, a filtering address set, and a multicast address, and newly create or delete a multicast group according to the tenant identifier, the filtering manner, the filtering address set and the multicast address.

In one embodiment, one or more computer readable nonvolatile storage media store computer readable instructions, the readable instructions are executed by one or more processors, so that one or more processors perform the steps: obtaining a multicast packet, the multicast packet carrying a tenant identifier, a destination address, and a source address; searching for a corresponding multicast group according to the tenant identifier and the destination address, the multicast group including multiple multicast members; obtaining routes corresponding to the multicast members, and generating a routing tree according to the routes corresponding to the multiple multicast members; obtaining members corresponding to the multicast members, and performing address filtering according to the source address and the member address, so as to obtain the address list of members that require a multicast packet; and encapsulating the multicast packet, and delivering the encapsulated multicast packet to the multicast members that require a multicast packet according to the address list of members and the routing tree.

In one embodiment, one or more processors are further configured to: obtain a report packet returned by the multiple multicast members; compute the routes corresponding to the multicast members according to the report packet; generate a routing tree according to the routes corresponding to the multiple multicast members; and obtain a routing tree topological structure used by the data plane, and write the routing tree corresponding to the multiple multicast members into the routing tree data structure used by a data plane according to the routing tree topological structure.

In one embodiment, the routing tree includes a host computer routing tree and a multicast group routing tree. One or more processors are further configured to: traverse nodes of the host computer routing tree, and obtain an increment change message of the host computer routing tree; and update the multicast group routing tree according to the increment change message of the host computer routing tree.

In one embodiment, one or more processors are further configured to: obtain a routing tree topological structure used by a data plane, and write the host computer routing tree and the multicast group routing tree into the routing tree data structure used by the data plane according to the routing tree topological structure; read the updated multicast group routing tree; and write the updated multicast group routing tree into the routing tree data structure used by the data plane, so as to finish route updating.

In one embodiment, one or more processors are further configured to: obtain a report packet corresponding to multicast members, the report packet carrying member addresses, a source address and a filtering manner; filter the addresses of the multiple multicast members based on the filtering manner according to the source address and the member addresses, so as to obtain the address list of members that require a multicast packet.

In one embodiment, the filtering manner includes a first filtering manner and a second filtering manner. One or more processors are further configured to: obtain a first filtering list corresponding to the first filtering manner, traverse the first filtering list, judge whether a member address in the first filtering list is the same as the source address, if a member address in the first filtering list is the same as the source address, duplicate subordinate multicast members to the first temporary list; obtain a second filtering list corresponding to the second filtering manner, traverse the second filtering list, and judge whether a member address in the second filtering list is the same as the source address, if a member address in the second filtering list is the same as the source address, delete the host computer corresponding to subordinate multicast members from the second temporary list; and combine the first temporary list and the second temporary list to obtain the address list of members that require a multicast packet.

In one embodiment, one or more processors are further configured to: receive a multicast group operation instruction sent by a terminal, the operation instruction carrying a tenant identifier, a filtering manner, a filtering address set, and a multicast address; and newly create or delete a multicast group according to the tenant identifier, the filtering manner, the filtering address set and the multicast address.

A person of ordinary skill in the art may understand that all or some of the steps of the foregoing embodiments may be implemented by a program instructing relevant hardware. The program may be stored in a non-volatile computer readable storage medium. When the program is executed, the program may include the flows of the embodiments of each foregoing method. The storage medium may be a magnetic disk, an optical disc, a read-only memory (ROM), or the like.

The foregoing embodiments only describe several implementation manners of the present disclosure, and their description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A cloud-end data multicast method, comprising:
    obtaining a multicast packet, the multicast packet carrying a tenant identifier, a host computer address, and a source address;
    searching for a multicast group according to the tenant identifier and the host computer address, the multicast group including multicast members;
    generating a host computer routing tree and a multicast group routing tree according to the multicast members, wherein the host computer routing tree includes the tenant identifier identifying a root node, one of the multicast members as a primary sub-node, and the host computer address as a secondary sub-node, and wherein the multicast group routing tree includes the tenant identifier identifying a root node and the host computer address as a primary sub-node;
    obtaining member addresses corresponding to the multicast members;
    obtaining an address list containing addresses of target members that are identified to receive the multicast packet by performing address filtering according to the source address and the member addresses;
    encapsulating the multicast packet to obtain an encapsulated multicast packet; and
    delivering the encapsulated multicast packet to the target members according to the address list, the host computer routing tree, and the multicast group routing tree.

2. The method according to claim 1, after generating the routing tree according to the multicast members, the method further comprising:
    traversing nodes of the host computer routing tree;
    obtaining an increment change message of the host computer routing tree; and
    updating the multicast group routing tree according to the increment change message of the host computer routing tree.

3. The method according to claim 1, further comprising:
    obtaining a routing tree topological structure and a routing tree data structure used by a data plane;
    writing the host computer routing tree and the multicast group routing tree into the routing tree data structure according to the routing tree topological structure to obtain an updated multicast group routing tree;
    reading the updated multicast group routing tree; and
    completing a route updating by writing the updated multicast group routing tree into the routing tree data structure.

4. The method according to claim 1, wherein the performing address filtering according to the source address and the member addresses comprises:
    obtaining report packets corresponding to the multicast members, each report packet carrying a member address of the multicast member, source addresses, and filtering manners corresponding to the source addresses; and
    obtaining the address list by filtering the member addresses of the multicast members based on filtering manners according to the source addresses and the member addresses of the multicast members.

5. The method according to claim 4, wherein the filtering manners include a first filtering manner and a second filtering manner, and the filtering the member addresses comprises:
    obtaining a first filtering list corresponding to multicast members having the first filtering manner;
    traversing the first filtering list and determining whether a member address in the first filtering list is the same as a source address;
    duplicating subordinate multicast members to a first temporary list upon determining a member address in the first filtering list is the same as the source address;
    obtaining a second filtering list corresponding to the second filtering manner;
    traversing the second filtering list and determining whether a member address in the second filtering list is the same as a source address;
    deleting a host computer corresponding to a second multicast member from the second temporary list upon determining a member address in the second filtering list is the same as a source address; and
    combining the first temporary list and the second temporary list to obtain the address list of the target members.

6. The method according to claim 1, further comprising:
    deleting the multicast group; and
    creating a second multicast group according to the tenant identifier, the host computer address, and the source address.

7. The method according to claim 1, wherein the host computer address is provided with first, second, and third source address filtering manners, wherein in the first source address filtering manner, only a multicast packet from a specified multicast source is received into the multicast group, wherein in the second source address, only a multicast packet other than from a specified multicast source is received into the multicast group, and wherein in the third source address filtering manner, arrival or departure of any of the multicast members is reported.

8. The method according to claim 1, wherein generating the host computer routing tree and the multicast group routing tree according to the multicast members comprises:
obtaining a report packet from one of the multicast members, wherein a package head of the report packet includes the host computer address and a package body of the report packet includes the source address; and
generating the host computer routing tree and the multicast group routing tree according to the multicast members and the report packet.

9. A cloud-end data multicast system, comprising: a memory and a processor coupled to the memory, the processor being configured to perform:
obtaining a multicast packet, the multicast packet carrying a tenant identifier, a host computer address, and a source address;
searching for a multicast group according to the tenant identifier and the host computer address, the multicast group including multicast members;
generating a host computer routing tree and a multicast group routing tree according to the multicast members, wherein the host computer routing tree includes the tenant identifier identifying a root node, one of the multicast members as a primary sub-node, and the host computer address as a secondary sub-node, and wherein the multicast group routing tree includes the tenant identifier identifying a root node and the host computer address as a primary sub-node;
obtaining member addresses corresponding to the multicast members;
obtaining an address list containing addresses of target members that are identified to receive the multicast packet by performing address filtering according to the source address and the member addresses;
encapsulating the multicast packet to obtain an encapsulated multicast packet, and send; and
delivering the encapsulated multicast packet to the target members according to the address list, the host computer routing tree, and the multicast group routing tree.

10. The system according to claim 9, wherein the processor is further configured to perform:
obtaining report packets returned by the multicast members; and
generating the host computer routing tree and the multicast group routing tree according to the multicast members and the report packets.

11. The system according to claim 9, wherein the processor is further configured to perform:
traversing nodes of the host computer routing tree;
obtaining an increment change message of the host computer routing tree; and
updating the multicast group routing tree according to the increment change message of the host computer routing tree.

12. The system according to claim 9, wherein the processor is further configured to perform:
obtaining a routing tree topological structure and a routing tree data structure used by a data plane;
writing the host computer routing tree and the multicast group routing tree into the routing tree data structure according to the routing tree topological structure to obtain an updated multicast group routing tree;
reading the updated multicast group routing tree; and
completing a route updating by the updated multicast group routing tree into the routing tree data structure.

13. The system according to claim 9, wherein the processor is further configured to perform:
obtaining report packets corresponding to the multicast members, each report packet carrying a member address of the multicast member, source addresses, and filtering manners corresponding to the source addresses; and
obtaining the address list by filtering the member addresses of the multicast members based on source address filtering manners according to the source addresses and the member addresses of the multicast members.

14. The system according to claim 13, wherein the processor is further configured to perform:
obtaining a first filtering list corresponding to multicast members having the first filtering manner;
traversing the first filtering list and determine whether a member address in the first filtering list is the same as a source address;
duplicating subordinate multicast members to a first temporary list upon determining a member address in the first filtering list is the same as a source address;
obtaining a second filtering list corresponding to the second filtering manner;
traversing the second filtering list and determine whether a member address in the second filtering list is the same as a source address;
deleting a host computer corresponding to a second multicast member from the second temporary list upon determining a member address in the second filtering list is the same as a source address; and
combining the first temporary list and the second temporary list to obtain the address list of the target members.

15. The system according to claim 9, wherein the processor is further configured to perform:
deleting the multicast group; and
creating a second multicast group according to the tenant identifier, the host computer address, and the source address.

16. A non-transitory storage medium storing computer readable instructions, when being executed by one or more processors, the computer readable instructions cause the one or more processors to perform:
obtaining a multicast packet, the multicast packet carrying a tenant identifier, a host computer address, and a source address;
searching for a multicast group according to the tenant identifier and the host computer address, the multicast group including multicast members;
generating a host computer routing tree and a multicast group routing tree according to the multicast members, wherein the host computer routing tree includes the tenant identifier identifying a root node, one of the multicast members as a primary sub-node, and the host computer address as a secondary sub-node, and wherein the multicast group routing tree includes the tenant identifier identifying a root node and the host computer address as a primary sub-node;
obtaining member addresses corresponding to the multicast members;
obtaining an address list containing addresses of target members that are identified to receive the multicast packet by performing address filtering according to the source address and the member addresses;
encapsulating the multicast packet to obtain an encapsulated multicast packet; and
delivering the encapsulated multicast packet to the target members according to the address list, the host computer routing tree, and the multicast group routing tree.

17. The storage medium according to claim 16, wherein the computer readable instructions further cause the one or more processors to perform:
- traversing nodes of the host computer routing tree;
- obtaining an increment change message of the host computer routing tree; and
- updating the multicast group routing tree according to the increment change message of the host computer routing tree.

18. The storage medium according to claim 16, wherein the computer readable instructions further cause the one or more processors to perform:
- obtaining a routing tree topological structure and a routing tree data structure used by a data plane;
- writing the host computer routing tree and the multicast group routing tree into the routing tree data structure according to the routing tree topological structure to obtain an updated multicast group routing tree;
- reading the updated multicast group routing tree; and
- completing a route updating by writing the updated multicast group routing tree into the routing tree data structure.

19. The storage medium according to claim 16, wherein the computer readable instructions further cause the one or more processors to perform:
- obtaining report packets corresponding to the multicast members, each report packet carrying a member address of the multicast member, source addresses, and filtering manners corresponding to the source addresses; and
- obtaining the address list by filtering the member addresses of the multicast members based on filtering manners according to the source addresses and the member addresses of the multicast members.

20. The storage medium according to claim 19, wherein the filtering manners include a first filtering manner and a second filtering manner, and the computer readable instructions further cause the one or more processors to perform:
- obtaining a first filtering list corresponding to multicast members having the first filtering manner;
- traversing the first filtering list and determining whether a member address in the first filtering list is the same as a source address included in the report packet of the multicast member having the member address;
- duplicating subordinate multicast members to a first temporary list upon determining a member address in the first filtering list is the same as the source address;
- obtaining a second filtering list corresponding to the second filtering manner;
- traversing the second filtering list and determining whether a member address in the second filtering list is the same as a source address;
- deleting a host computer corresponding to a second multicast member from the second temporary list upon determining a member address in the second filtering list is the same as a source address; and
- combining the first temporary list and the second temporary list to obtain the address list of the target members.

* * * * *